(12) United States Patent
Sikroria (10) Patent No.: US 10,358,091 B2
(45) Date of Patent: Jul. 23, 2019

(54) AUTOMATED VEHICLE MIRROR ADJUSTMENT

(71) Applicant: Shivam Sikroria, Jericho, NY (US)

(72) Inventor: Shivam Sikroria, Jericho, NY (US)

(73) Assignee: Shivam Sikroria, Jericho, NY (US)

( * ) Notice: Subject to any disclaimer, the term of this patent is extended or adjusted under 35 U.S.C. 154(b) by 247 days.

(21) Appl. No.: 13/951,969

(22) Filed: Jul. 26, 2013

(65) Prior Publication Data

US 2015/0030207 A1    Jan. 29, 2015

(51) Int. Cl.
*B60R 1/07* (2006.01)
*G06T 7/73* (2017.01)

(52) U.S. Cl.
CPC .......... *B60R 1/07* (2013.01); *G06T 7/73* (2017.01); *B60R 2300/8026* (2013.01); *G06T 2207/10004* (2013.01); *G06T 2207/10028* (2013.01); *G06T 2207/30201* (2013.01); *G06T 2207/30268* (2013.01)

(58) Field of Classification Search
CPC ..... B60R 1/07; B60R 2300/8026; G06T 7/73; G06T 2207/10004; G06T 2207/10028; G06T 2207/30201; G06T 2207/30268
See application file for complete search history.

(56) References Cited

U.S. PATENT DOCUMENTS

| | | | |
|---|---|---|---|
| 5,949,592 A * | 9/1999 | Brandin .................. 359/843 |
| 5,959,367 A * | 9/1999 | O'Farrell et al. ......... B60R 1/00 307/10.1 |
| 6,390,631 B1 * | 5/2002 | Lang et al. .................... 359/843 |
| 6,501,536 B1 * | 12/2002 | Fredricks .................. B60R 1/02 180/271 |
| 6,714,665 B1 * | 3/2004 | Hanna ....................... G06K 9/00 382/106 |
| 7,373,249 B2 * | 5/2008 | Ivanov ......................... 359/843 |
| 7,415,126 B2 * | 8/2008 | Breed et al. .................. 382/100 |
| 8,200,397 B2 * | 6/2012 | Ryu et al. ....................... 701/49 |
| 8,285,457 B1 | 10/2012 | Askew |
| 2006/0149426 A1 * | 7/2006 | Unkrich ................ B60R 25/255 701/1 |
| 2011/0122520 A1 | 5/2011 | Verheyden |
| 2013/0038732 A1 * | 2/2013 | Waite ....................... B60R 1/00 348/148 |
| 2013/0258512 A1 | 10/2013 | Raz et al. |

FOREIGN PATENT DOCUMENTS

WO    WO-2012172492 A1 * 12/2012 ............... B60R 1/02

* cited by examiner

*Primary Examiner* — Katrina R Fujita
(74) *Attorney, Agent, or Firm* — Moritt Hock & Hamroff LLP; Bret P. Shapiro (57) ABSTRACT

Technologies are generally described for methods and systems effective to adjust a position of a mirror in a vehicle. In an example, a method for adjusting a position of a mirror in a vehicle may include a processor effective to receive an image of an operator of a vehicle. The processor may identify a reference point in the image and depth data. The processor may generate a mirror adjustment signal based on the depth data and the reference point. The processor may further send the mirror adjustment signal to the mirror to adjust a position of the mirror.

16 Claims, 4 Drawing Sheets

AUTOMATED VEHICLE MIRROR ADJUSTMENT

BACKGROUND

Unless otherwise indicated herein, the materials described in this section are not prior art to the claims in this application and are not admitted to be prior art by inclusion in this section.

A vehicle may include mirrors located inside of the vehicle or attached to the vehicle. An operator of the vehicle may adjust the mirrors manually. Manual adjustment of the mirrors may be based on a visual coverage area of the operator. As the visual coverage area of the operator changes, the mirrors may remain in the same position.

SUMMARY

In some examples, methods for generating a mirror adjustment signal effective to adjust a position of a mirror in a vehicle are generally described. The methods may include by a processor, receiving an image of an operator of the vehicle. The methods may include identifying a reference point in the image. The methods may include receiving depth data that indicates a distance between a sensor and the operator. The methods may include generating a mirror adjustment signal based on the depth data and the reference point. The methods may include sending the mirror adjustment signal to one or more motors in the mirror.

In some examples, a system configured to generate a mirror adjustment signal to adjust a position of a mirror in a vehicle is generally described. The system may include a memory and a camera configured to capture an image of an operator of the vehicle. The system may include a motor controller. The system may include a processor configured in communication with the memory, the camera, the sensor, and the motor controller. The processor may be configured to receive the image and identify a reference point in the image. The processor may be configured to generate a mirror adjustment signal based on the reference point and send the mirror adjustment signal to the motor controller.

In some examples, a vehicle configured to generate a mirror adjustment signal is generally described. The vehicle may include a mirror, where the mirror includes a first motor effective to adjust the mirror in a first direction and a second motor effective to adjust the mirror in a second direction. The vehicle may include a memory and a camera configured to capture an image of an operator of the vehicle. The vehicle may include a sensor configured to generate depth data that indicates a distance between the sensor and the operator and a motor controller configured in communication with the mirror. The vehicle may include a processor configured in communication with the memory, the camera, the sensor, and the motor controller. The processor may be configured to receive the image and identify a reference point in the image. The processor may be configured to receive the depth data, generate a mirror adjustment signal based on the depth data and the reference point, and send the mirror adjustment signal to the motor controller.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

all arranged according to at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to automated vehicle mirror adjustment.

Figure 1:
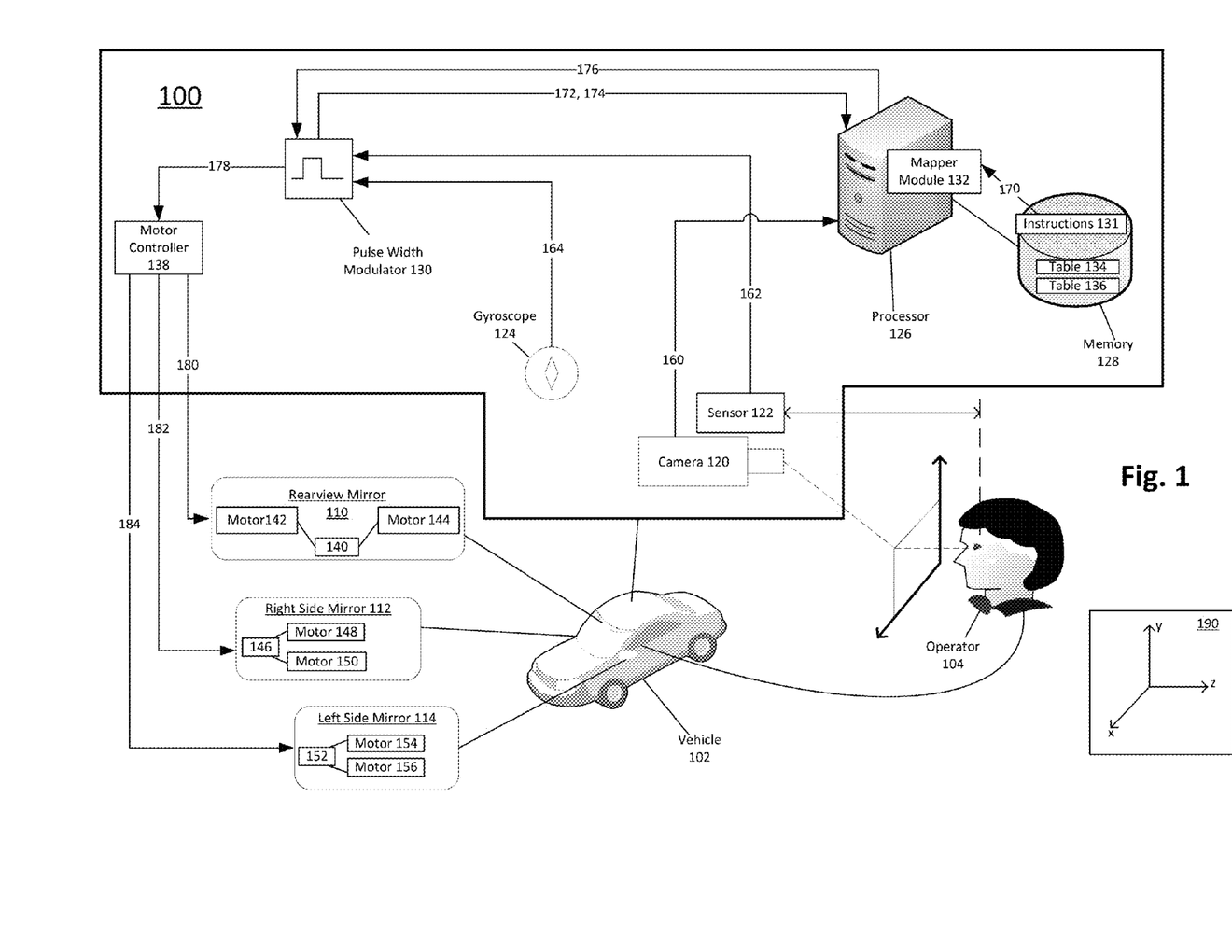
FIG. 1 illustrates an example system that can be utilized to implement automated vehicle mirror adjustment.

FIG. 1 illustrates an example system that can be utilized to implement automated vehicle mirror adjustment arranged in accordance with at least some embodiments described herein. As described in more detail below, a processor may identify a three dimensional position of a reference point of an operator—such as the operator's eyes. Based on the identified reference point, the processor may analyze tables and generate a mirror adjustment signal to position one or more mirrors in a vehicle.

A vehicle 102 may include an example system 100, a rearview mirror 110, a right side mirror 112 and/or a left side mirror 114. An operator 104 may operate vehicle 102. System 100 may include a camera 120, a sensor 122, a gyroscope 124, a processor 126, a memory 128, a pulse width modulator 130, and/or a motor controller 138. Camera 120 may, for example, be placed behind a steering wheel of vehicle 102. Sensor 122 may be at the same distance from operator 104 as camera 120. Sensor 122 may be aligned above or below camera 120. Rearview mirror 110 may include a rear motor controller 140, a motor 142 and/or a motor 144. Right side mirror 112 may include a right motor controller 146, a motor 148 and/or a motor 150. Left side mirror 114 may include a left motor controller 152, a motor 154 and/or a motor 156. Processor 126 may include a mapper module 132. Memory 128, pulse width modulator 130 and/or motor controller 138 may be inside or outside of processor 126. Memory 128 may include instructions 131, a table 134 and/or a table 136.

Camera 120 may be configured to capture an image 160 periodically. Camera 120 may be an infrared camera and may be effective to detect eyes even when operator 104 is wearing glasses, sunglasses, or when operator 104 is driving in the dark. Image 160 may be an image of operator 104 such as a face of operator 104. For example, camera 120 may be configured to capture an image of operator 104 every 10 seconds. Instructions 131 may include image processing algorithms effective to process image 160. Mapper module 132 may include algorithms effective to search for data in table 134 and/or table 136. Processor 126 may be configured in communication with camera 120, memory 128, and/or pulse width modulator 130. Camera 120 may send image 160 to processor 126. In response to receiving image 160 from camera 120, processor 126 may execute instructions 131 to analyze image 160 and generate a pair of coordinates 170. Coordinates 170 may include one or more pairs of coordinates. Each pair of coordinates in coordinates 170 may include a first variable and a second variable effective to identify a reference point referring to a feature, such as an eye, or a point between the eyes of operator 104. The first and second variables may respectively be x-component and y-component of a pair of coordinates in a three-dimensional Cartesian coordinate system, such as illustrated at 190.

Pulse width modulator 130 may be configured in communication with sensor 122, gyroscope 124, processor 126 and/or motor controller 138. Pulse width modulator 130 may be configured to send data to processor 126 and/or motor controller 138. Pulse width modulator 130 may be further configured to receive data from sensor 122 and/or gyroscope 124 and then deliver to processor 126. Sensor 122 may be configured to generate sensor signal 162. Sensor signal 162 may be an analog signal corresponding to a distance between camera 120 and operator 104. Gyroscope 124 may be configured to generate gyroscope signal 164. Gyroscope signal 164 may be an analog signal corresponding to an orientation of vehicle 102. Pulse width modulator 130 may be configured to respectively convert sensor signal 162 and/or gyroscope signal 164 into depth data 172 and/or orientation data 174. Depth data 172 and/or orientation data 174 may each be a digital signal.

Table 134 may include data that maps coordinates 170, and maps depth data 172, to interim values. Table 136 may include preset data that maps the interim values to positions of rearview mirror 110, right side mirror 112 and/or left side mirror 114. Table 136 may be populated by a user and may include different values for different types of vehicles. For example, a large truck may have different preset values than a small car.

Processor 126 may use mapper module 132 to analyze a combination of coordinates 170 and/or depth data 172 and identify particular preset data from table 136. Processor 126 may process the particular preset data from table 136 and generate adjustment data 176. Adjustment data 176 may include a string of integers, where each integer may represent a time value. Processor 126 may send adjustment data 176 to pulse width modulator 130. Pulse width modulator 130 may convert adjustment data 176 into a mirror adjustment signal 178. Mirror adjustment signal 178 may be an analog signal. Pulse width modulator 130 may send mirror adjustment signal 178 to motor controller 138.

Motor controller 138 may be configured to receive mirror adjustment signal 178 from pulse width modulator 130. Motor controller 138 may be configured in communication with rear motor controller 140, right motor controller 146 and/or left motor controller 152. Rear motor controller 140 may be configured in communication with motor 142 and motor 144. Right motor controller 146 may be configured in communication with motor 148 and motor 150. Left motor controller 150 may be configured in communication with motor 154 and motor 156.

Motor controller 138 may separate mirror adjustment signal 178 into rear motor signal 180, right motor signal 182 and/or left motor signal 184. Motor controller 138 may send rear motor signal 180 to rear motor controller 140 in rearview mirror 110. Motor controller 138 may send right motor signal 182 to right motor controller 146 in right side mirror 112. Motor controller 138 may send left motor signal 184 to left motor controller 152 in left side mirror 114. As discussed in more detail below, in response to receiving rear motor signal 180, right motor signal 182 and/or left motor signal 184, rearview mirror 110, right side mirror 112 and/or left side mirror 114 may be adjusted to a new position.

Figure 2:
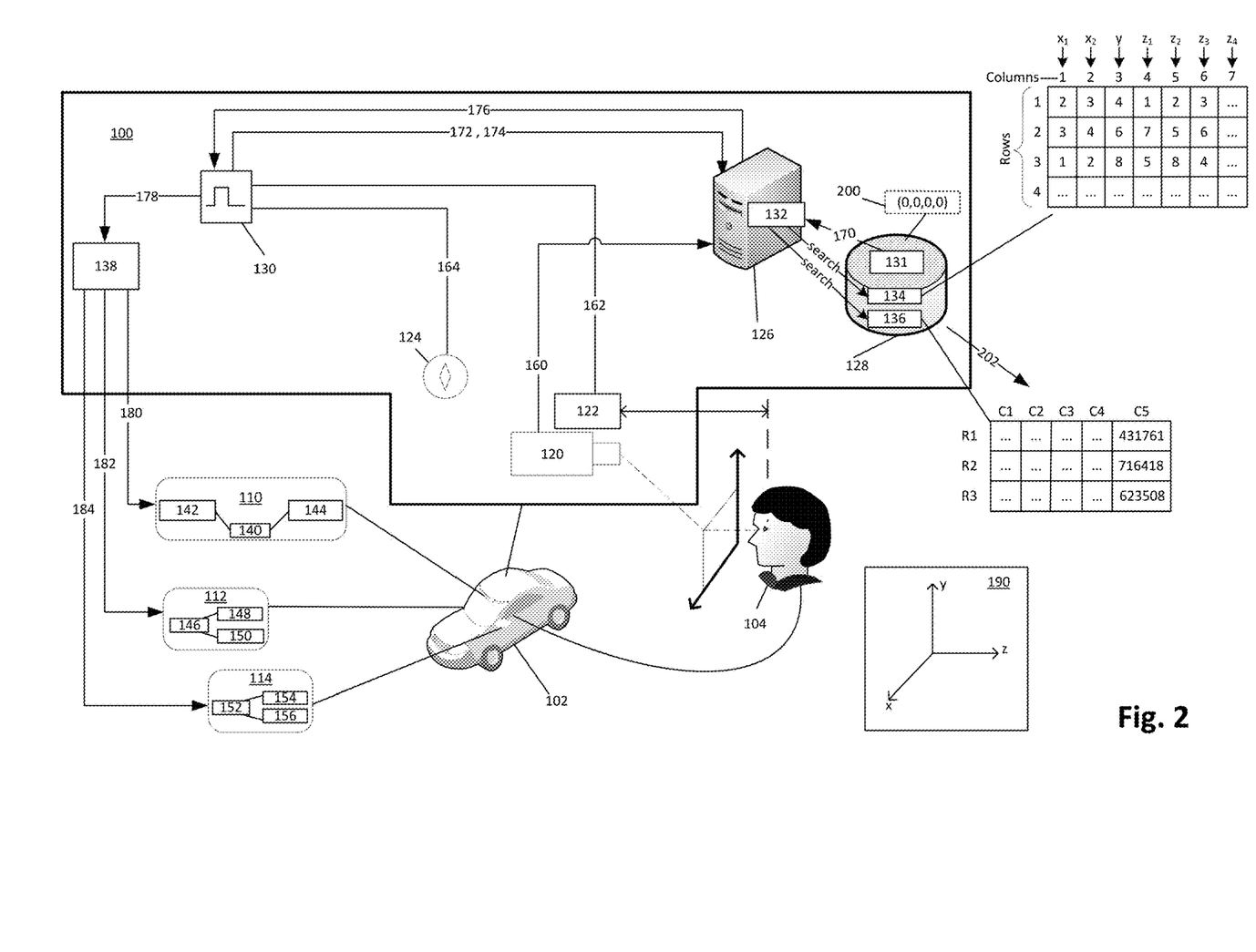
FIG. 2 illustrates an implementation of the example of FIG. 1 relating to automated vehicle mirror adjustment.

FIG. 2 illustrates an implementation of the example of FIG. 1 relating to automated vehicle mirror adjustment arranged in accordance with at least some embodiments described herein. FIG. 2 includes elements in system 100 of FIG. 1, with additional details. Those components in FIG. 2 that are labeled identically to components of FIG. 1 will not be described again for the purposes of clarity.

In operation, operator 104 may start an ignition of vehicle 102. In response to starting an ignition of vehicle 102, system 100 may be enabled. Camera 102 may capture an image 160 of operator 104 periodically. Camera 102 may send image 160 to processor 126. Processor 126 may receive image 160 and store image 160 in memory 128. Processor 126 may execute instruction 131 to analyze image 160 and generate coordinates 170. For example, a location of camera 120 may be an origin of Cartesian system 190. Coordinates 170 may include two pairs of coordinates (e.g. 3,6 and 4,6). Coordinates (3,6) may identify a right eye of operator 104 in image 160. Coordinates (4,6) may identify a left eye of operator 104 in image 160. In the example, Coordinates (3,6) may identify a point 3 units away from camera 120 in the positive x-direction and 6 units away from camera 120 in the positive y-direction. Coordinates (4,6) may identify a point 4 units away from camera 120 in the positive x-direction and 6 units away from camera 120 in the positive y-direction.

In another example, coordinates 170 may include one pair of coordinates representing a left eye or right eye of operator 104 in image 160. In another example, coordinates 170 may include one pair of coordinates representing a point centered between a left eye and a right eye of operator 104 in image 160. In another example, coordinates 170 may include one or more pair of coordinates representing points with an image property of image 160, such as darkest points, or a particular range of intensity, of image 160. A programming library such as OpenCV may generate instructions 131 and may be used to identify coordinates 170.

Sensor 122 may generate sensor signal 162. In an example, sensor 122 may be a proximity sensor effective to emit infrared light. Sensor 122 may target operator 104 and emit infrared light towards operator 104. In response to infrared light reflecting off of operator 104, sensor 122 may generate sensor signal 162. In another example, sensor 122 may in inside camera 120.

Pulse width modulator 130 may receive sensor signal 162 from sensor 122 and convert sensor signal 162 into depth data 172. Depth data 172 may be a digital signal and may include a distance between sensor 122 and operator 104. For example, depth data 172 may include a value of "5" distance units. Pulse width modulator 130 may receive gyroscope signal 164 from gyroscope 124 and convert gyroscope signal 164 into orientation data 174. Orientation data 174 may be digital signal and may include a positive or negative angle value indicating an orientation of vehicle 102. For example, orientation data 174 may include a value of "10" degrees. In another example, orientation data 174 may include a value of "−10" degrees. Pulse width modulator 130 may send depth data 172 and orientation data 172 to processor 126.

Table 134 and table 136 may be pre-populated based on different positions of operator 104 in vehicle 102. Column 1 of table 134 may include different values of $x_1$, where $x_1$ may represent x-position of a right eye of operator 104 in image 160. Column 2 of table 134 may include different values of $x_2$, where $x_2$ may represent x-position of a left eye of operator 104 in image 160. Column 3 of table 134 may include different values of y, where y may represent y-position of right and/or left eye of operator 104 in image 160. In another example (not shown), y may be $y_1$ and a new column including different values of a variable $y_2$ may be inserted between column 3 and column 4 of table 134. Variables $y_1$ and $y_2$ may respectively represent y-position of a right eye and a left eye of operator 104 in image 160.

Columns 4, 5, 6 of table 134 may include different values of depth data 172. Each respective row of table 134 may include more than one unique value of depth data 172 corresponding to values of $x_1$, $x_2$ and y in that respective row. For example, row 1 of table 134 includes coordinates (2,4), (3,4) and different depth data 1, 2, 3, corresponding to coordinates (2,4) and (3,4). In a pre-population mode, processor 126 may receive position values from a user corresponding to positions of rearview mirror 110, right side mirror 112 and/or left side mirror 114. Processor 126 may use mapper module 132 to process the position values to generate preset data in table 136. Each preset data in table 136 may include strings of positive or negative values. In some examples, $x_1$ may affect values of the third and fourth digit of preset data in table 136 and $x_2$ may affect values of the fifth and sixth digit of preset data in table 136.

Processor 126 may receive depth data 172 and orientation data 174. In response to receiving depth data 172 and orientation data 174, processor 126 may use mapper module 132 to search table 134 for values that correspond to coordinates in coordinates 170. For example, processor 126 may identify a right eye of operator 104 is positioned at coordinate (3,6) and a left eye of operator 104 is positioned at (4,6) in image 160. Processor 126 may search for a value "3" in column 1, a value "4" in column 2, and a value "6" in column 3. Processor 126 may successfully identify that row 2 of table 134. Processor 126 may generate a pointer 202 indicating "R2", where R2 may represent "row 2 of table 136". Processor 126 may continue to use mapper module 132 to search for depth data "5" in row 2 of table 134. Processor 126 may first search column 4 in row 2 of table 134, then column 5 in row 2 of table 134, etc. Processor 126 may successfully identify depth data "5" in column 5 in row 2 of table 134. Processor 126 may modify pointer 202 to indicate "R2C5", where "R2C5" may represent "row 2 and column 5" of table 136. Processor 126 may then identify a particular preset data "716418" in row 2 and column 5 of table 136.

Memory 128 may store a default value 200. Default value 200 may be "000000" and may represent a prior position of rearview mirror 110, right side mirror 112 and/or left side mirror 114. Processor 126 may generate adjustment data 176 by performing a calculation on particular preset data "716418" and default values 200. In an example, processor 126 may generate adjustment data 176 by subtracting each digit in default values 200 from particular preset data "716418", such as "7−0=7", "1−0=1", "6−0=6", "4−0=4, "1−0=1" and "8−0=8". Adjustment data 176 may then be "7,1,6,4,1,8". Processor 126 may replace default values 200 with current values of adjustment data 176 so that subsequent preset data are adjusted based on the prior value of the adjustment data. Processor 126 may send adjustment data 176 to pulse width modulator 130. Pulse width modulator 130 may receive adjustment data 176 and convert adjustment data 176 into mirror adjustment signal 178. Mirror adjustment signal 178 may be an analog signal. Pulse width modulator 130 may send mirror adjustment signal 178 to motor controller 138.

Motor controller 138 may receive mirror adjustment signal 178. Motor controller 138 may separate mirror adjustment signal 178 into rear motor signal 180, right motor signal 182 and left motor signal 184. For example, motor controller 138 may separate "7,1,6,4,1,8" into (7,1), (6,4), and (1,8). Motor controller 138 may assign data (7,1) to rear motor signal 180 and send rear motor signal 180 to rear motor controller 140. Motor controller 138 may assign data (6,4) to right motor signal 182 and send right motor signal 182 to right motor controller 146. Motor controller 138 may assign data (1,8) to left motor signal 184 and send left motor signal 184 to left motor controller 152.

In another example, default values 200 may be "716418". Coordinates 170 may be a pair of coordinates (1,8) and depth data 172 may include a distance value of "4" distance units. Processor 126 may use mapper module 132 to search for coordinates (1,8) in columns 1,2 of table 134. Processor 126 may successfully identify coordinates (1,8) in row 3 of table 134. Processor 126 may generate pointer 202 indicating "R3". Processor 126 may continue to use mapper module 132 to search for depth data "4" in row 3 of table 134. Processor 126 may successfully identify depth data "4" in column 5 in row 3 of table 134. Processor 126 may modify pointer 202 to indicate "R3C5". Processor 126 may identify a particular preset data "623508" in row 3 and column 5 of table 136.

Processor 126 may generate adjustment data 176 by performing a calculation on particular preset data "623508" and default values 200. Processor 126 may subtract each digit in default values 200 from particular preset data "623508", such as "6−7=−1", "2−1=1", "3−6=−3", "5−4=1, "0−1=−1" and "8−8=0". Adjustment data 176 may be "−1, 1, −3, 1, −1, 0" and default values 200 may be replaced by adjustment data 176. Processor 126 may send adjustment data 176 to pulse width modulator 130. Pulse width modulator 130 may receive adjustment data 176 and convert adjustment data 176 into mirror adjustment signal 178. Pulse width modulator 130 may send mirror adjustment signal 178 to motor controller 138.

Motor controller 138 may receive mirror adjustment signal 178. Motor controller 138 may separate mirror adjustment signal 178 into rear motor signal 180, right motor signal 182 and left motor signal 184. For example, motor controller 138 may separate "−1, 1, −3, 1, −1, 0" into (−1,1), (−3,1), and (−1,0). Motor controller 138 may assign data (−1,1) to rear motor signal 180 and send rear motor signal 180 to rear motor controller 140. Motor controller 138 may assign data (−3,1) to right motor signal 182 and send right motor signal 182 to right motor controller 146. Motor controller 138 may assign data (−1,0) to left motor signal 184 and send left motor signal 184 to left motor controller 152. Data assigned by motor controller 138 may correspond to a number of seconds to drive respective motors to result in an adjusted position of a mirror.

In another example, processor 126 may generate adjustment data by subtracting each digit in default values 200 from preset data identified in table 136 and operate on the result using factor corresponding to orientation data 174. Adjustment data 176 may then be a scaled variation of preset data identified in table 136. For example, orientation data 174 may be "−10" degrees. Processor 126 may subtract 1 from each number in adjustment data "−1, 1, −3, 1, −1, 0". Adjustment data may become "−2, 0, −4, 0, −2, −1". In another example, processor 126 may multiply adjustment data 176 by a factor corresponding to orientation data 174.

Figure 3:
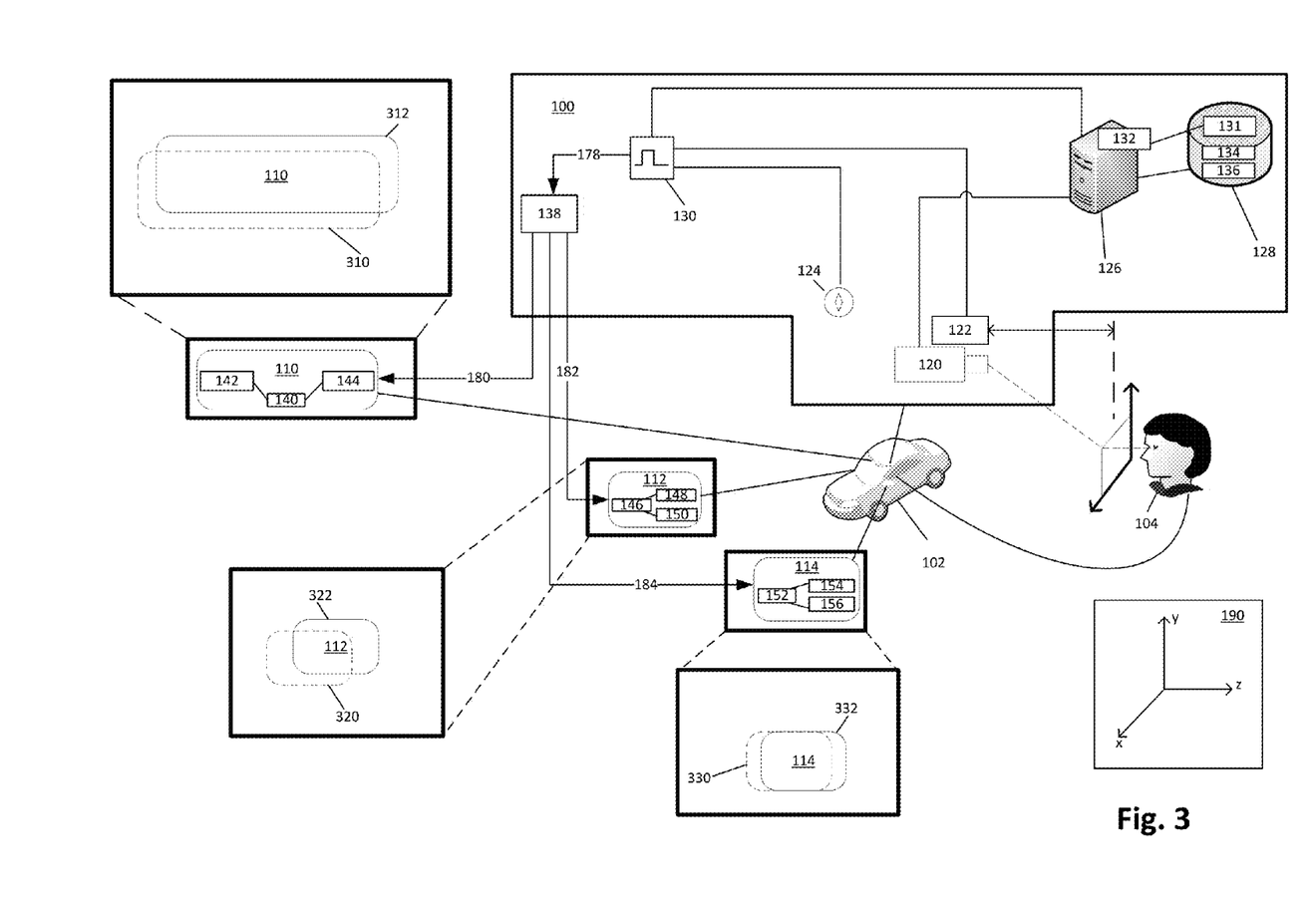
FIG. 3 illustrates a result of the implementation in FIG. 2 relating to automated vehicle mirror adjustment.

FIG. 3 illustrates a result of the implementation in FIG. 2 relating to automated vehicle mirror adjustment arranged in accordance with at least some embodiments described herein. FIG. 3 includes elements in system 100 of FIG. 1 and FIG. 2, with additional details. Those components in FIG. 3 that are labeled identically to components of FIG. 1 and FIG. 2 will not be described again for the purposes of clarity.

In an example, with reference to both FIGS. 2 and 3, motor controller 138 may assign data (−1,1) to rear motor signal 180 and send rear motor signal 180 to rear motor controller 140. Motor controller 138 may assign data (−3,1) to right motor signal 182 and send right motor signal 182 to right motor controller 146. Motor controller 138 may assign data (−1,0) to left motor signal 184 and send left motor signal 184 to left motor controller 152.

Motor 142 may be configured to adjust rearview mirror 110 in a positive or negative x-direction of Cartesian system 190. Motor 144 may be configured to adjust rearview mirror 110 in a positive or negative y-direction of Cartesian system 190. In response to receiving rear motor signal 180, rear motor controller 140 may distribute rear motor signal 180 to motor 142 and motor 144. Rear motor controller 140 may receive (−1,1) from motor controller 138 and respectively send "−1" and "1" to motor 142 and motor 144. Motor 142 may receive "−1" and adjust rearview mirror 110 for 1 second in the negative x-direction. Motor 144 may receive "1" and adjust rearview mirror 110 for 1 second in the positive y-direction. As shown in FIG. 3, rearview mirror 110 may be adjusted from an initial position 310 to a new position 312.

Motor 148 may be configured to adjust right side mirror 112 in a positive or negative x-direction of Cartesian system 190. Motor 150 may be configured to adjust right side mirror 112 in a positive or negative y-direction of Cartesian system 190. In response to receiving right motor signal 182, right motor controller 146 may distribute right motor signal 180 to motor 148 and motor 150. Right motor controller 146 may receive (−3,1) from motor controller 138 and respectively send "−3" and "1" to motor 148 and motor 150. Motor 148 may receive "−3" and adjust right side mirror 112 for 3 seconds in the negative x-direction. Motor 150 may receive "1" and adjust right side mirror 110 for 1 second in the positive y-direction. As shown in FIG. 3, right side mirror 112 may be adjusted from an initial position 320 to a new position 322.

Motor 154 may be configured to adjust left side mirror 114 in a positive or negative x-direction of Cartesian system 190. Motor 156 may be configured to adjust left side mirror 114 in a positive or negative y-direction of Cartesian system 190. In response to receiving left motor signal 180, left motor controller 152 may distribute left motor signal 184 to motor 154 and motor 156. Left motor controller 152 may receive (−1,0) from motor controller 138 and respectively send "−1" and "0" to motor 154 and motor 156. Motor 154 may receive "−1" and adjust left side mirror 114 for 1 second in the negative x-direction. Motor 156 may receive "0" and left side mirror 114 may not be adjusted in the positive y-direction. As shown in FIG. 3, left mirror 114 may be adjusted from an initial position 330 to a new position 332.

Figure 4:
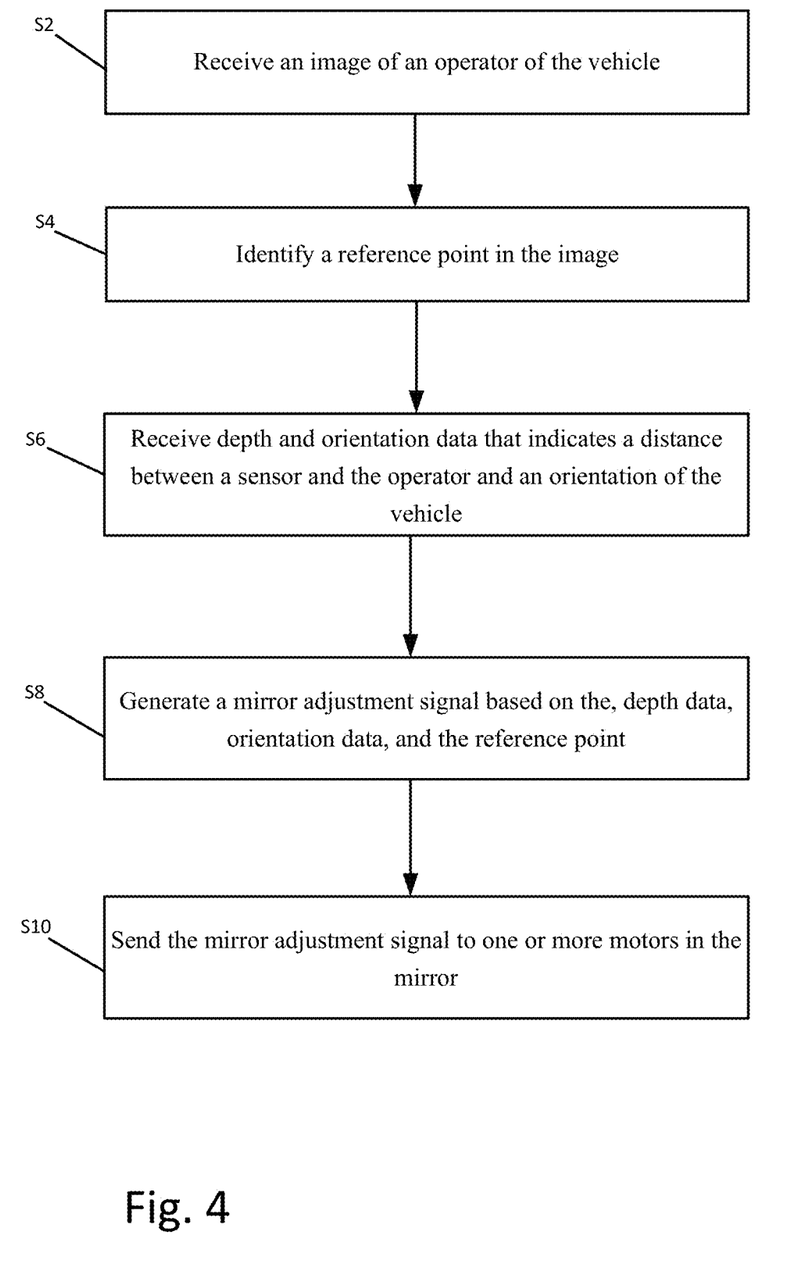
FIG. 4 depicts a flow diagram for an example process for implementing automated vehicle mirror adjustment.

FIG. 4 depicts a flow diagram for an example process for implementing automated vehicle mirror adjustment arranged in accordance with at least some embodiments described herein. In some examples, the process in FIG. 4 could be implemented using system 100 discussed above to adjust a mirror in a vehicle.

An example process may include one or more operations, actions, or functions as illustrated by one or more blocks S2, S4, S6, S8 and/or S10. Although illustrated as discrete blocks, various blocks may be divided into additional blocks, combined into fewer blocks, or eliminated, depending on the desired implementations.

Processing may begin at block S2, "Receive an image of an operator of the vehicle". At block S2, a processor may receive an image of an operator of a vehicle.

Processing may continue from block S2 to S4, "Identify a reference point in the image." At block S4, the processor may identify a reference point in the image. The reference point may be an eye of the operator in the image, a point centered between the eyes of the operator in the image, or a point with an image property such as a darkest point, of a particular intensity, of the image.

Processing may continue from block S4 to S6, "Receive depth and orientation data that indicates a distance between a sensor and the operator and an orientation of the vehicle." At block S6, the processor may receive depth data from a sensor. The depth data may be a distance between the sensor and the operator.

Processing may continue from block S6 to S8, "Generate a mirror adjustment signal based on the depth data, orientation data, and the reference point." At block S8, the processor may generate a mirror adjustment signal by first comparing the depth data and the reference point with data in a table. Then, the processor may selectively identify data from another table based on the comparison. The processor may further process the identified data to generate the mirror adjustment signal.

Processing may continue from block S8 to S10, "Send the mirror adjustment signal to one or more motors in the mirror." At block S10, the processor may send the mirror adjustment signal to one or more motors in the mirror.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for generating a mirror adjustment signal effective to adjust a position of first, second, and third mirrors in a vehicle, the method comprising, by a processor:
receiving an image of an operator of the vehicle from a camera, wherein the image is captured by the camera;
identifying a reference point in the image captured by the camera, wherein the reference point relates to a position of the operator relative to the camera, and the reference point is identified by a first and a second variable;
receiving depth data that indicates a distance between a sensor and the operator;
searching a table for values that correspond to the first and second variables;
identifying the values that correspond to the first and second variables based on the search in the table;

in response to the identification of the values that correspond to the first and second variables, searching the table for a value of the depth data based on the identified values;
generating an adjustment signal based on the value of the depth data identified by the search in the table, and based on the reference point, wherein the adjustment signal includes adjustment information for the first mirror, the second mirror, and the third mirror of the vehicle;
separating the adjustment signal into:
a first mirror adjustment signal effective to facilitate adjustment of a position of the first mirror of the vehicle;
a second mirror adjustment signal effective to facilitate adjustment of a position of the second mirror of the vehicle; and
a third mirror adjustment signal effective to facilitate adjustment of a position of the third mirror of the vehicle; and
sending the first mirror adjustment signal to a first motor of the first mirror, the second mirror adjustment signal to a second motor of the second mirror, and the third mirror adjustment signal to a third motor of the third mirror simultaneously.

2. The method of claim 1, wherein identifying the reference point includes analyzing the image.

3. The method of claim 1, where the reference point is an eye of the operator.

4. The method of claim 1, wherein the table is a first table and generating the adjustment signal comprises:
searching the first table to produce a search result;
generating a pointer based on the search result, where the pointer includes an address of particular data in a second table; and
identifying the particular data in the second table.

5. The method of claim 4, wherein generating the adjustment signal includes generating adjustment data based on the particular data and based on a default value, where the default value is based on prior positions of the first, second, and third mirrors.

6. The method of claim 5, wherein the adjustment data corresponds to a number of seconds to drive the first, second, and third motors to move the first, second, and third mirrors.

7. A system configured to generate a mirror adjustment signal to adjust a position of first, second, and third mirrors in a vehicle, the system comprising:
a memory;
a camera configured to capture an image of an operator of the vehicle;
a motor controller; and
a processor configured in communication with the memory, the camera, the sensor, and the motor controller, wherein the processor is configured to:
receive, from the camera, the image captured by the camera;
identify a reference point in the image captured by the camera, wherein the reference point relates to a position of the operator relative to the camera, and the reference point is identified by a first and a second variable;
receive depth data;
search a table for values that correspond to the first and second variables;
identify the values that correspond to the first and second variables based on the search in the table;
in response to the identification of the values that correspond to the first and second variables, search the table for a value of the depth data based on the identified values;
generate an adjustment signal based on the value of the depth data identified by the search in the table, and based on the reference point, wherein the adjustment signal includes adjustment information for the first mirror, the second mirror, and the third mirror of the vehicle;
send the adjustment signal to the motor controller, wherein the motor controller is configured to separate the adjustment signal into:
a first mirror adjustment signal effective to facilitate adjustment of a position of the first mirror of the vehicle;
a second mirror adjustment signal effective to facilitate adjustment of a position of the second mirror of the vehicle; and
a third mirror adjustment signal effective to facilitate adjustment of a position of the third mirror of the vehicle.

8. The system of claim 7, further comprising:
the depth sensor, wherein the depth sensor is configured to generate the depth data, and wherein the depth data indicates a distance between the camera and the operator;
a gyroscope configured to generate orientation data;
and wherein the adjustment signal is further based on the orientation data.

9. The system of claim 7, wherein the motor controller is further configured to send the first, second, and third mirror adjustment signals to a first motor of the first mirror, a second motor of the second mirror, and a third motor of the third mirror, respectively.

10. The system of claim 7, wherein the processor is further configured to:
identify the reference point in the image based on an analysis of the image.

11. The system of claim 7, wherein the table is a first table and the processor is further configured to:
search the first table to produce a search result;
generate a pointer based on the search result, where the pointer includes an address of a particular data in a second table; and
identify the particular data in the second table.

12. The system of claim 11, wherein the processor is further configured to generate the adjustment signal based on the particular data and based on a default value, where the default value is based on a prior position of the mirror.

13. The system of claim 12, wherein the adjustment data corresponds to a number of seconds to drive respective motors to move the first, second, and third mirrors.

14. A vehicle configured to generate a mirror adjustment signal for first, second, and third mirrors of the vehicle, the vehicle comprising:
the first mirror, where the first mirror includes:
a first motor effective to adjust the first mirror in a first direction; and
a second motor effective to adjust the first mirror in a second direction;
the second mirror, where the second mirror includes:
a third motor effective to adjust the second mirror in the first direction; and
a fourth motor effective to adjust the second mirror in the second direction;
the third mirror, where the third mirror includes:

a fifth motor effective to adjust the third mirror in the first direction; and
a sixth motor effective to adjust the third mirror in the second direction;
a memory;
a camera configured to capture an image of an operator of the vehicle;
a sensor configured to generate depth data that indicates a distance between the sensor and the operator;
a motor controller configured in communication with the first, second, and third mirrors; and
a processor configured in communication with the memory, the camera, the sensor, and the motor controller, wherein the processor is configured to:
receive, from the camera, the image captured by the camera;
identify a reference point in the image captured by the camera, wherein the reference point relates to a position of the operator relative to the camera, and the reference point is identified by a first and a second variable;
receive the depth data;
search a table for values that correspond to the first and second variables;
identify the values that correspond to the first and second variables based on the search in the table;
in response to the identification of the values that correspond to the first and second variables, search the table for a value of the depth data based on the identified values;
generate an adjustment signal based on the value of the depth data and the reference point, wherein the adjustment signal includes adjustment information for the first mirror, the second mirror, and the third mirror; and
send the adjustment signal to the motor controller, wherein the motor controller is configured to separate the adjustment signal into:
a first mirror adjustment signal effective to facilitate adjustment of a position of the first mirror of the vehicle;
a second mirror adjustment signal effective to facilitate adjustment of a position of the second mirror of the vehicle; and
a third mirror adjustment signal effective to facilitate adjustment of a position of the third mirror of the vehicle.

15. The vehicle in claim 14, wherein the motor controller is further configured to:
send the first mirror adjustment signal to the first motor and the second motor, the second mirror adjustment signal to the third motor and the fourth motor, and the third mirror adjustment signal to the fifth motor and the sixth motor simultaneously.

16. The system of claim 14, wherein the processor is further configured to:
identify the reference point in the image based on an analysis of the image.

* * * * *